United States Patent Office 3,216,907
Patented Nov. 9, 1965

3,216,907
FERMENTATION PROCESS FOR DETERMINING MICROBIAL SENSITIVITY TO ANTIMICROBIAL AGENTS
Leon S. Goldman, 4504 15th Ave., Brooklyn, N.Y.
No Drawing. Filed May 23, 1963, Ser. No. 285,544
6 Claims. (Cl. 195—103.5)

This invention relates to a rapid micro-method for determining the viability of microorganisms, and more specifically to a process for determining the sensitivity of microorganisms to antimicrobial agents by detecting the presence or absence of minute quantities of glucose as an index of said sensitivity.

In the prior art microbial sensitivity to antimicrobial agents are determined primarily by the serial dilution method and by the agar diffusion method. Other methods employ an indicator like oxyhemoglobin or redox indicators which are generally added to the culture medium after a substantial growth is obtained due to the toxicity of said redox indicators.

Antibiotic sensitivity is determined by the above-named methods only after a definite growth phase has been reached. The methods are time-consuming, involve unstable culture media, and in general are limited to hospitals and laboratories.

The ability of microorganisms to ferment glucose has been suggested as a basis of determining the viability of microorganisms. More specifically, it involves the use of substantial quantities of glucose in the culture medium (generally between 0.5% to 2.0%). The glucose is fermented by the viable microorganism, forming acids which lower the pH of the culture medium. If an antibiotic and a pH indicator are added to the glucose broth prior to inoculation, the pH indicator will change its color as the pH of the medium drops only when the microorganism is not affected by the antibiotic under question; when microorganisms are sensitive to the antibiotic, no fermentation will occur and the color of the broth will remain unchanged.

The glucose fermentation test for the determination of bacterial sensitivity to antibiotics is not reliable because numerous microorganisms will not form acids from glucose and consequently the pH indicator color will not change. If an organism utilizes glucose in its metabolic processes without forming acid, or if an organism utilizes glucose to a slight extent, erroneous results would be obtained.

Furthermore, in the sensitivity testing methods of the prior art, including the glucose-fermentation method, the lag phase must be overcome and the growth phase must be reached (although the actual growth may not necessarily be visible with the naked eye) for optimum results. This means that provisions must be made for considerable incubation time, particularly when the specimen is obtained directly from the lesion. These methods generally require the use of an incubator for earlier results. A heavy inoculum from the lesion, which produces earlier results, is in most cases difficult to obtain. The number of antibiotics that may be tested simultaneously is generally limited. Special provisions must be made for the cultivation of anaerobes which require the use of elaborate apparatus. Furthermore, strict aseptic technique must be followed during the performance of the tests.

For purposes of clarification, Buchanan has divided a typical bacterial growth curve into seven parts: (a) initial stationary phase, (b) lag phase or positive growth acceleration phase, (c) logrithmic growth phase, (d) negative growth acceleration phase, (e) maximum stationary phase, (f) phase of accelerated death, and (g) logarithmic death phase. In this specification and appended claims of this patent application, the term "lag phase" refers essentially to parts (a) and (b) of Buchanan's classification and the term "growth phase" in this application refers essentially to parts (c), (d) and (e) of Buchanan's divisions. Parts (f) and (g) are essentially of no importance in the process disclosed in this patent application.

In my copending application, Serial No. 76,438, filed December 13, 1960, and now U.S. Patent 3,197,384, a redox indicator and various antibiotisc are bound to filter paper by an insoluble non-toxic resin. Due partially to the bond of the resin and to the chemical nature of the indicator salt, the redox indicator is essentially at a sublethal concentration, and is slowly and effectively released after the inosculated nutrient liquid has wetted the paper to produce the color indication.

In my United States Patent No. 3,043,751, issued on July 10, 1962, a non-toxic highly insoluble redox indicator is deposited into the fibers of a filter pad. Various antibiotics are released from small premarked areas, diffusing across the treated filter pad to provide the color indication when an inoculated nutrient liquid has wetted said treated paper.

An object of this invention is to provide an extremely rapid and reliable method for determining microbial sensitivity to antimicrobial agents involving simple apparatus.

A further object of this invention is to provide for the utilization of minute quantities of inoculum which will nevertheless result in an unusually high ratio of inoculum to nutrient liquid.

Still another object of this invention is to provide for microbial sensitivity determinations without the aid of an incubator.

Still another object of this invention is to provide for microbial sensitivity testing during the lag phase of microbial "growth," thus providing for very early results.

Still another object of this invention is to provide for the testing of numerous antimicrobial agents simultaneously in a simple manner.

Still another object of this invention is to provide for a method of testing microbial sensitivity to antimicrobial agents where contamination during the performance of the test presents little or no problem.

Still another object of this invention is to provide for testing anaerobes in essentially the same simple manner employed in the testing of aerobic microorganisms.

This invention is based upon my discovery that all microorganisms will rapidly utilize (and, therefore, destroy) very minute quantities of glucose provided in a culture medium when said microorganisms are not inhibited by an antimicrobial agent. When microorganisms are sensitive to an antimicrobial agent, the trace quantity of glucose will remain practically unchanged. I have discovered that numerous microorganisms that are known "not to ferment glucose," and are listed as such in such authoritative manuals as Bergey's, will nevertheless utilize minute quantities of this sugar during their lag phase; said absence of fermentation-properties as reported in the literature referring then to substantial quantities of glucose and not to minute trace amounts.

The important aspect governing the role of the initial trace-quantity of glucose is whether it is present, whether it is appreciably diminished, or whether it is absent after a very brief period of incubation. The fate of the glucose in this invention is unimportant; a gas may or may not be formed, an acid may or may not be formed. A conventional "non-fermentor" (in accordance with the classical definition) like *T. Mentagrophytes, E. floccosum, Sarcina lutea,* an obligate aerobic organism, an amoeba, etc., will utilize practically all the trace quantities of glucose in a simple culture medium if no antimicrobial agents are present to affect its growth.

For purposes of clarification the term "antimicrobial agent" in this specification and claims refers to any agent, natural or synthetic, that will materially affect the growth of a microorganism; examples of antimicrobial agents are antibiotics like penicillin, streptomycin, erythromycin, etc.; the sulfa drugs, the mercurials, the quaternary ammonium compounds, etc. For purpose of clarification, the terms "microbe" and "microbial" of this invention refer not only to bacteria, but also to yeasts, fungi, molds, protozoa, etc.

In addition, for purposes of clarification, the term "trace quantity," employed in this application, refers to a concentration of a substance in solution that is barely detectable by means of a sensitive test for said dissolved substance. The "trace quantity" becomes, therefore, in effect, a threshold quantity and represents a concentration below which the test for said substance will be essentially negative; it is therefore easy to see that the "trace quantity" depends upon the test employed to detect this material.

A very useful method for detecting trace quantities of glucose, which is specific for glucose and may be utilized in this invention, involves the following scheme: In the presence of minute quantities of glucose, the enzyme "glucose oxidase" will immediately destroy said glucose to form gluconic acid and hydrogen peroxide. The liberated hydrogen peroxide then reacts with a catalyst-chromogen combination to produce a blue to purple color.

This system, containing glucose-oxidase and the catalyst-chromogen combination and containing no bacteria nor any other living organism, hereinafter referred to as "specific glucose indicator," is conventional and is commercially available. Small paper strips, impregnated with the ingredients of "specific glucose indicator" are now employed to detect the presence of glucose in urine and is sold under such trade marks as "Testape," "Clinistix," "Combistix," etc. "Specific glucose indicator" is employed in the present invention to detect the utilization or lack of utilization of trace quantities of glucose which thus becomes an index of the viability of microorganisms, particularly in the presence of antimicrobial agents.

This invention is, therefore, a method and process of cultivating microorganisms in a specially prepared nutrient broth, containing but a trace of glucose, in the presence of various antibiotics, allowing for a very brief period of incubation generally at room temperature, finally detecting the presence or absence of said initial trace-quantity of glucose at the end of said short period of incubation by means of "specific glucose indicator." The invention is the employment of this special nutrient liquid in a process which achieves as an end result valuable data on microbial sensitivity to antimicrobial agents in a surprisingly short time.

Numerous arrangements may be devised to utilize the basic principle of the process which is the basis of this invention. For examples, one such article of manufacture may be prepared as follows:

Small chemically pure filter pads are cut to an approximate area of one square centimeter. The geometric shapes of the pads are unimportant, but may however be utilized to recognize the antimicrobial agents they contain; the geometric shapes may also be employed to recognize the controls, described below. The small filter pads are saturated with a special nutrient liquid and dried. The bottom of the pads are then treated with small quantities of various anti-microbial agents and dried. It is important that the antimicrobial agents be confined to the bottom of the pad and that no antimicrobial agent be present on the surface of the pad. This may be accomplished by stamping the surface of the pads with minute quantities of antibiotic solutions and drying rapidly so that no appreciable diffusion of said antibiotic occurs at this stage. The treated surfaces of the various small filter pads are now adhered to the bottom of a glass or plastic dish, such as a square or round petri dish, said pads spaced approximately ½ to 1 inch apart. The filter pads may be conveniently adhered to the bottom of the dish by coating the bottom of the dish with a non-toxic cement, like rubber cement, allowing the cement to become tacky, and spacing the various filter pads on said stick surface, antibiotic-side down. Instead of treating the under-sides of the filter pads with various antimicrobial agents, one may achieve the same result (or better) by first smearing the bottom of the dish with the non-toxic cement, allowing the cement to become tacky, placing minute pre-measured quantities of various antibiotics on said tacky surface in premarked areas, and then pressing the filter pads containing the dried special nutrient liquid upon the tacky surface in the proper position. In this latter feature of this invention, the minute quantities of the various antibiotics may be placed upon the tacky surface of the dish in one of two ways: (1) as a tiny thin filter pad impregnated with antibiotic, said tiny thin filter pad covering an area smaller than the area of the larger filter pad containing the dehydrated culture medium, so that the larger pad would also readily adhere to the bottom of the dish; or (2) by placing a minute quantity of an antibiotic solution directly upon the pre-marked tacky surface and allowing to dry rapidly, the area covered by the minute quantity of antibiotic solution being smaller than the area of the filter pad containing the dehydrated culture medium.

The upper surfaces of the filter pads may be marked in any convenient manner in order to indicate the antibiotic it contains, the marked or printed designations being visible by looking into the dish through the transparent cover. One may also adhere a printed chart or diagram to the outside bottom of the dish, the printed surface of the chart in contact with the outside bottom of the transparent dish and therefore visible through the top.

In addition to the numerous filter pads, spaced on the inside of the dish and treated with the special nutrient liquid and antimicrobial agents properly identified (the antimicrobial agents being essentially on the underside of the various pads), three additional pads are also prepared to serve as controls. One control, hereinafter referred to as C–1, contains the same special nutrient liquid but contains no antibiotics; C–1 ultimately being inoculated like the other pads. The second control, C–2, contains the same special nutrient liquid but the trace quantity of glucose is omitted; this pad is also inoculated with microorganisms in performing the test. The third control, C–3, is identical to C–1, except that no microorganisms are added to this pad when the test is performed.

The nutrient liquid may be any of the numerous broths, or modifications thereof, now employed in the cultivation of microorganisms with one provision: the concentration of glucose of the nutrient liquid is carefully adjusted, by generally adding or perhaps even removing glucose, to an optimum trace quantity of glucose that is just sufficient to indicate a moderate positive reaction with "specific glucose indicator" in a period of approximately one minute at room temperature. The "specific glucose indicator" is a sensitive test for glucose and so the concentration of glucose is adjusted to a trace quantity which is in effect slightly above the limit of sensitivity of the test. The careful adjustment of the glucose concentration is a most important feature of this test. The desirable trace quantity of glucose of this invention depends of course upon the limit of sensitivity of the test employed to detect said trace quantity; this in turn depends upon conditions of the test, the age of the reagents employed, plus numerous other factors. In employing the conventional "specific glucose indicator," I have found a glucose concentration range of approximately one part in 500 to one part in 10,000, referring to a concentration of 0.2% to 0.01%, respectively. It is understood that this range of glucose concentration is merely illustrative, and often would permit a lower limit of even 0.001%. The effective glucose concentration is determined by first choosing a prepared batch of the "specific glucose indicator" and then adjusting the concentration of the glucose in the special nutrient liquid to a value that is just sufficient to yield a moderately positive reaction, said value generally falling within the concentration range as specified above.

In the manufacture of the special nutrient liquid one may begin with any of the conventional culture media and add the required critical quantity of glucose, checking with "specific glucose indicator." It should be noted that glucose, chemically known as "D glucose," is in equilibrium in solution with two other forms of glucose, namely "alpha D glucose" and "beta D glucose," said equilibrium mixture achieved several hours after the D glucose is brought into solution. In view of the fact that the enzyme glucose oxidase contained in the "specific glucose indicator" appears to decompose the beta D glucose most readily, it is best to adjust the critical concentration of the special nutrient liquid with solutions of glucose that are not freshly prepared, namely a glucose solution at least 24 hours old wherein the equilibrium mixture has been achieved.

In the manufacture of the nutient liquid, certain extract or infusions may be employed. Occasionally these infusions may contain a glucose concentration above the critical trace-quantity. A convenient way to remove or lower the glucose concentration to the desired level is to inoculate this extract or infusion with a microorganism that rapidly destroys the undesirable glucose. The pH is then adjusted and the solution filtered and sterilized. The concentration of glucose is then adjusted as indicated above. Examples of culture media that may be employed in this invention, to which the correct trace quantity of glucose is then added, are "nutrient broth," "heart infusion," "mycin assay broth," etc. For the slower growing yeasts and molds, one may add a broad spectrum antibiotic, like chloramphenicol, in order to eliminate bacterial contamination and yet not effect the metabolic activities of said yeasts and molds.

A feature of this invention involves the utilization of a nontoxic binding agent to provide for the localization of antimicrobial agents at the bottom surface of the filter pads, thereby preventing or minimizing the dispersion or transfer of said antimicrobial agents from one pad to another during the inoculation. The chemical nature of this binding agent is unimportant; it must however be non-toxic to the microorganism. Examples of effective binding agents are the various methyl celluloses, nitrocellulose, gums like gum acacia, non-toxic resins like purified shellac, the polyvinyl polymers, etc. The binding agents acts by providing a brief, but delayed, wetting time of the underside of the filter pads, thus preventing the release of the antibiotics unto the inoculating swab, as will be explained below. The three controls are also treated in the same manner. The binding agent is combined with the antibiotic solution and is evaporated from solution along with the antibiotic. In general, the viscosity is increased and diffusibility of the antibiotic solution is decreased by virtue of the binding agent it contains and hence said binding agent serves two additional functions in this invention: (1) when the undersurfaces of the filter pads are treated with the antibiotic solutions by a stamping or spraying action, the viscosity of the solution is such that little or no penetration of the antibiotic occurs into the body of the filter pad before it is rapidly dried; and (2) when this article of manufacture is prepared by adding solutions of antibiotics to premarked areas on the tacky surface of the dish before placing the pads into position, the small volume of antibiotic solution placed on said tacky surface does not spread readily, but remains localized before it dries, by virtue of the high viscosity of the binding agents.

"Specific glucose indicator" is best employed by utilizing tiny filter pads, approximately 5 millimeters by 5 millimeters, containing all the ingredients of the indicator system in the dry state. In determining the presence of trace-quantities of glucose on any of the filter pads in the dish, one simply places one of the tiny filter pads, treated with "specific glucose indicator" and stored in an air-tight dry container, on the surfaces of all the filter pads in the dish after they have been wetted, inoculated and incubated, controls included, and notes the color indications after one minute.

The test is performed in the following manner: The operator secures some of the exudate from the lesion or infected body fluid unto the surface of a cotton applicator swab. He then gently touches each of the treated filter pads within the dish, including controls C–1 and C–2 but not C–3, with a gentle rolling motion. This rolling motion is performed with minimum pressure and in this manner the operator has inoculated the surfaces of the dry filter pads without appreciably transmitting the various antibiotics from one pad to another; the antibiotics are essentially not dispersed among the many filter pads because said antibiotics are primarily on the underside of the filter pads, said dispersion further prevented by the presence of the binding agent. Recalling that C–2 contains no glucose, it is best to begin the inoculations with C–2 (which contains no glucose), then inoculate C–1, and then inoculate all the other pads (with the exception of C–3). In following this sequence there is no possibility of transmitting some of the glucose from the other pads unto pad C–2. Immediately after inoculating the pads, the operator then adds one drop of ordinary tap water to each of the pads (boiled water is employed if the chlorine-content is high or if the possibility of water pollution exists). The dish is covered and kept at room temperature. The diffusion of the antibiotics commences almost immediately through the wet pad. The metabolic activities of the microorganisms also commence immediately (although growth may not occur immediately) and will continue during the period of incubation unless the organisms are sensitive to the antibiotics. If an antibiotic is lethal to the microorganism, the trace-quantity of glucose is hardly affected. On the other hand, if the microorganism is not appreciably sensitive to the antibiotic under consideration, the trace quantity of glucose will rapidly disappear. At the end of the incubation period, the operator places identical tiny filter pads containing the "specific glucose indicator" upon each of the filter pads by means of a forceps, controls included, and records the color changes after one minute.

The incubation period is surprisingly brief in this invention. I have found that the average incubation time needed at room temperature (25° C.) is approximately between 15 minutes to ½ hour for most bacteria. Examples of such bacteria are E. coli, Staph. and Strep., Aerobacter spp., Proteus vulgaris, B. subtilis, the Clostridia, etc. For the organisms having metabolic activities that are appreciably slower, like the molds and fungi, an incubation period of about 1½ to 2 hours is generally sufficient.

All the filter pads are sterilized, including the dish, as a precautionary measure in the manufacture of this equipment. However, in performing the test, a septic technique is not absolutely essential since the incubation period is so short and since the size of the inoculum, although small, is nevertheless comparatively overwhelmingly greater than the quantity of any foreign microorganisms that may contaminate the dish when it is opened.

In the interpretation of the obtained results, the three controls are examined. C–1, containing glucose, nutrient liquid, microorganisms but no antibiotics, should yield no color indication when "specific glucose indicator" is added, since the trace quantity of glucose has been destroyed by the organisms. C–2, containing the nutrient liquid without glucose, without antibiotics but containing microorganisms, should also produce no color indication with "specific glucose indicator," since no glucose is present. C-3, containing nutrient liquid plus glucose without antibiotics and without microorganisms, should yield a positive color indication since there are no microorganisms to decompose said glucose. If all three controls yield their proper color indications, as indicated above, the color indications of the other filter pads are then examined and recorded. No color change (equivalent to the appearances of C-1 and C-2) means no sensitivity because the trace-quantity of glucose is absent after incubation; a color change (equivalent to C-3) means sensitivity because the trace-quantity of glucose has not been appreciably decomposed by the killed or attenuated microorganisms. Variations in color may indicate partial inhibition.

If C-1 does indicate a color change, it probably means that a longer period of incubation may be necessary, that the incubation should be conducted at a higher temperature (37° C.), or that the inoculum may be unusually large and may perhaps contain one of the enzymes that are an integral part of "specific glucose indicator" in an unusually high concentration. If C-2 were to indicate a color change, this may be due to the inoculum itself containing large quantities of glucose; here, too, a longer time of incubation may be helpful in decomposing the excess glucose. In this case, too, the possibility of the inoculum itself containing some of the factors responsible for the color indication (as indicated above with C-1), should not be overlooked. If C-3 indicates no color change, this may indicate that the "specific glucose indicator" pads are old and inactive (exposures to high temperature, light and moisture will inactivate said pads). In either event, regardless of the reason, if and when the three controls produce incorrect color indications, the color indications for the various other pads are considered meaningless and the test is repeated once again under new and rectified conditions.

It appears then that in performing this test the "growth phase," as defined above, is practically never reached. As soon as the various inoculated pads are wetted by the drops of water, the various metabolic activities commence virtually immediately with the trace-quantity of glucose diffusing across the bacterial wall membranes, being decomposed almost immediately by the viable microorganisms before the actual multiplication of microorganisms commences; when the organism is sensitive to a specific antimicrobial agent, the metabolic activities rapidly cease and the trace-quantity of glucose is hardly affected. Anaerobes do not present much of a problem. While it is true that many of the strict anaerobes soon die in the presence of oxygen, they will do so only after having utilized all or a substantial part of the trace-quantity of glucose and hence the results obtained for these organisms will be reliable.

Small filter pads are employed in this invention because they require a small quantity of nutrient liquid, thereby providing for an unusually high ratio of inoculum to nutrient liquid, which is desirable in this test. The small pads also provide for the performance of numerous simultaneous testing of various antimicrobial agents in an average-sized petri plate.

This test, although not quantitative and although not providing for the identification of the microorganism, will yield very early results on microbial sensitivity to antimicrobial agents. It will also yield valuable information on the viability of microorganisms. It is advisable to inoculate a standard or special culture medium with the same cotton swab when further and more elaborate tests are needed.

It is understood that the apparatus described above merely illustrates but one of the numerous arrangements made possible by this invention. Numerous other arrangements may be devised without departing from the spirit and scope of this invention. For example: One may utilize small capillary pipettes instead of the filter pads in sensitivity testing. The capillary tubes are prepared by draining a solution of the nutrient liquid plus antibiotic and allowing the residual liquid in said tubes to dry. The solution is of course carefully prepared so that the residue contained on the inner surface of said dried tubes contains the proper concentration of ingredients that comprise the nutrient liquid, that the antibiotic concentration is correct, and that the glucose is present in the proper trace-quantity. The proper control tubes are prepared and the test is performed by bringing the treated dried capillary tubes to the exudate of the lesion, said tubes spontaneously filling with the liquid exudate by capillary action thereby dissolving the materials contained in said capillary tubes. The inoculum may also be dispersed in water and the treated capillary tubes filled with this suspension of microorganisms. After a suitable period of incubation, the capillary tubes are simply drained unto "specific glucose indicator" pads and the color indications recorded as above.

Since the basic discovery and process in this invention is the utilization of trace-quantities of glucose by viable microorganisms, one can devise other suitable arrangements for the detection of said trace-quantity of glucose without departing from the scope of said invention. For example: One is not necessarily limited to detecting the trace-quantities of glucose with "specific glucose indicator," for other highly sensitive micro-methods may be employed or devised for the detection of said trace-quantity of glucose by those skilled in the art. One may employ anthrone in sulfuric acid to detect trace quantities of sugar; one may employ alpha-naphthol in sulfuric acid or thymol for said detection. One may also employ a freshly prepared tetrazolium salt in concentrated alkali for said detection. In employing the above-mentioned reagents for the detection of trace-quantities of sugar, one should avoil filter pads made of cellulose or similar materials since these reagents, being corrosive in nature, will decompose the pads; fiberglass pads or glass capillary tubes would be more suitable.

What is claimed is:

1. A process for the detection of microbial sensitivity to antimicrobial agents, comprising the following steps: (a) preparation of a nutrient broth containing glucose at a concentration between 0.001 and 0.2%, said broth also containing the antimicrobial agent under consideration; (b) inoculating said broth with infectious material containing the microorganisms under consideration; (c) incubating said inoculated broth for a period of time sufficient to permit the antimicrobial agent to inhibit the metabolic processes of the microorganism; (d) and finally testing with a colorimetric method for the presence of said glucose as an index of microbial sensitivity.

2. A process for the detection of microbial sensitivity to antimicrobial agents, in accordance with claim 1, wherein the glucose is detected by a specific indicator for glucose comprising glucose oxidase and a catalyst-chromagen combination, deposited in dry form upon a filter pad.

3. A process for the detection of microbial sensitivity to antimicrobial agents, in accordance with claim 1, wherein said incubation and detection is achieved within the pores of filter pads as the supporting medium.

4. A process for the detection of microbial sensitivity to antimicrobial agents, in accordance with claim 1, wherein the detection of glucose is achieved by means of the anthrone-sulfuric acid test.

5. A process for the detection of microbial sensitivity to antimicrobial agents, in accordance with claim 1, wherein the detection of glucose is achieved by means of a tetrazolium salt in a strongly alkaline solution.

6. A process for determining microbial sensitivity to antimicrobial agents comprising the steps of inoculating, with a microorganism being tested, and then incubating a culture medium containing a minute quantity of glucose at a concentration between 0.001 and 0.2 percent and an antimicrobial agent, said antimicrobial agent preventing the decomposition of said glucose by the microorganism being tested when said microorganism is sensitive to said antimicrobial agent, and not preventing the decomposition of said glucose by the microorganism being tested when said microorganism is not sensitive to said antimicrobial agent, and then testing for the presence of said glucose as an index of microbial sensitivity, the incubation period being long enough to permit the antimicrobial agent to act.

References Cited by the Examiner
UNITED STATES PATENTS

| | | | |
|---|---|---|---|
| 2,981,606 | 4/61 | Keston | 195—103.5 |
| 3,008,879 | 11/61 | Harvill | 195—103.5 |
| 3,107,204 | 10/63 | Brown et al. | 195—103.5 |

A. LOUIS MONACELL, *Primary Examiner.*